United States Patent [19]
Grayson

[11] 3,901,076
[45] Aug. 26, 1975

[54] TROLLING DRAG METER

[76] Inventor: Robert E. Grayson, Rt. 2 South, Great Falls, Mont. 59401

[22] Filed: Jan. 24, 1974

[21] Appl. No.: 436,380

[52] U.S. Cl. ................................................. 73/184
[51] Int. Cl.[2] ......................................... G01C 21/00
[58] Field of Search ...................... 73/184, 188, 189

[56] References Cited
UNITED STATES PATENTS

| 495,587 | 4/1893 | Holt | 73/184 |
|---|---|---|---|
| 2,707,878 | 5/1955 | Cameron | 73/184 |

Primary Examiner—Donald O. Woodiel
Attorney, Agent, or Firm—Clarence A. O'Brien; Harvey B. Jacobson

[57] ABSTRACT

A trolling drag meter having a bell-crank pointer pivotably mounted on a frame arrangeable on a boat, and the like. The frame is formed by a pair of angle brackets adjustably connected together to form a channel which is preferably engageable with a boat side wall. A spring normally biases the pointer toward a zero drag indication on a scale provided on the frame, while a drag line arranged in the water creates a force which overcomes this normal bias to a degree that is a function of the amount of drag on the drag line. The line is guided from the frame into water as by a rigid tube mounted on the frame and suitably arranged for this purpose. Both the drag line and spring are connected to the bell-crank pointer, with the spring advantageously being a torsion coiled spring having the coils thereof arranged about a shaft forming a portion of the pointer. One end of the spring may be anchored to the shaft, while the other end abuts the frame, or more specifically a pivot bracket pivotally mounting the pointed shaft on the frame.

8 Claims, 3 Drawing Figures

TROLLING DRAG METER

BACKGROUND OF THE INVENTION

1. Field of the Invention

This invention relates generally to drag meters, and particularly to a trolling drag meter for boats.

2. Description of the Prior Art

Speed indicators for boats have been proposed in which a weight or drag is trailed in the water by a line connected to a spring-biased indicating device mounted on the boat. An example of such a device can be found in U.S. Pat. No. 3,706,223, issued Dec. 19, 1972 to H. R. Dickens.

SUMMARY OF THE INVENTION

It is an object of the present invention to provide a drag line boat drag meter that is simplier of construction and more reliable of operation when compared with known devices of this kind.

It is another object of the present invention to provide a boat trolling drag meter that is a single unit.

It is still another object of the present invention to provide a trolling drag meter that can be clamped on the side wall, and the like, of a boat, and which eliminates the necessity for a separate guide, and the like, to be mounted on the boat for guiding the drag line into the water on which the boat is supported.

These and other objects are achieved according to the present invention by providing a trolling drag meter having: a frame mountable on a boat; a pointer mounted on the frame for pivotal movement with respect thereto; a spring, and the like, associated with the pointer and frame for biasing the pointer toward a one direction of the pivotal movement thereof; and a drag line connected to the pointer for arrangement in water on which the boat associated with the frame is riding for indicating the relative amount of drag of the drag line through the water as a function of the pivotal movement of the pointer in the direction opposite to the one direction of pivotal movement.

The frame is preferably formed by a pair of angle brackets, each of the brackets having a pair of legs. One leg of one of the brackets is provided with a slot extending longitudinally toward the other leg of the same bracket, and the leg provided with the slot is arranged abutting the bracket in such a manner as to form a substantially U-shaped channel. A fastener is associated with the slot for adjustably connecting together the angle brackets so that the channel formed thereby may be clamped over boat side walls, and the like, of varying thicknesses.

The pointer assembly includes a pivot bracket mounted on the channel, and a shaft pivotally mounted on the pivot bracket. The shaft is provided with substantially parallel arms extending in opposite directions from spaced ends of the shaft. One of these arms is connected to the drag line and forms a crank therefor, while the other of the arms forms a pointer which cooperates with a scale formed by markings on the channel-forming frame. The shaft, crank, and pointer cooperate to form what may be termed a bell-crank pivot pointer.

According to a preferred embodiment of the present invention, the spring is a coiled torsion spring having a pair of ends. The coils of the spring are arranged around the shaft, with one of the ends of the spring anchored in a hole provided in the shaft and the other of the ends abutting the pivot bracket or other fixed point on the device.

The drag line has a line connected adjacent the outer end of the crank, and a weight or drag connected to the other end of the line. A tube mounted on the frame is arranged extending toward the water associated with the drag line, and the line is arranged in the tube for being guided itself toward the water. In this manner, the necessity for separate line guides, and the like, is eliminated.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 2:
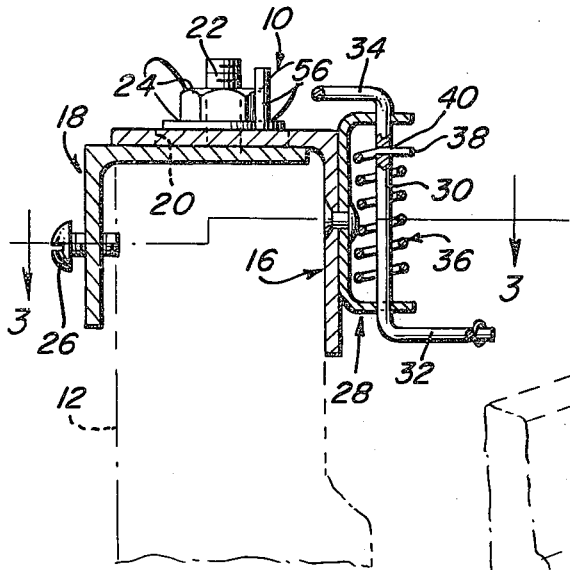
FIG. 2 is a sectional view taken generally along the line 2—2 of FIG. 1.
Figure 1:
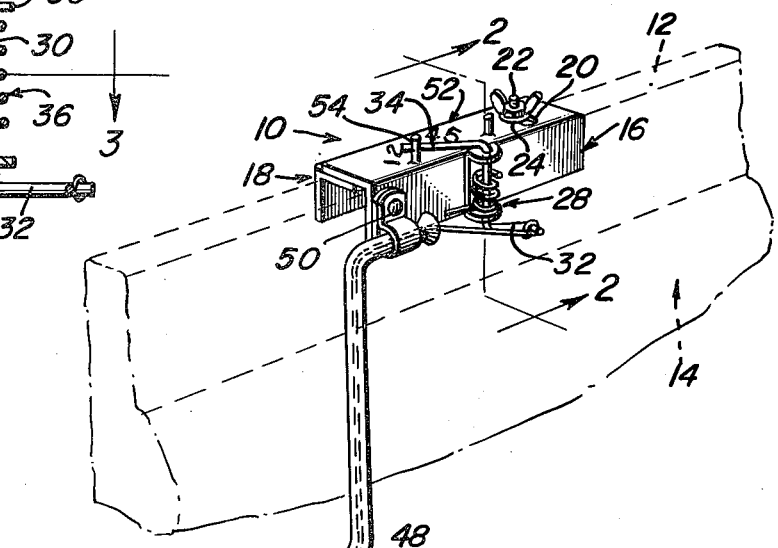
FIG. 1, arranged in the upper right-hand corner of the sheet of drawing, is a perspective view showing a trolling drag meter according to the present invention mounted on a wall of a boat, the latter being shown in broken lines.
Figure 3:
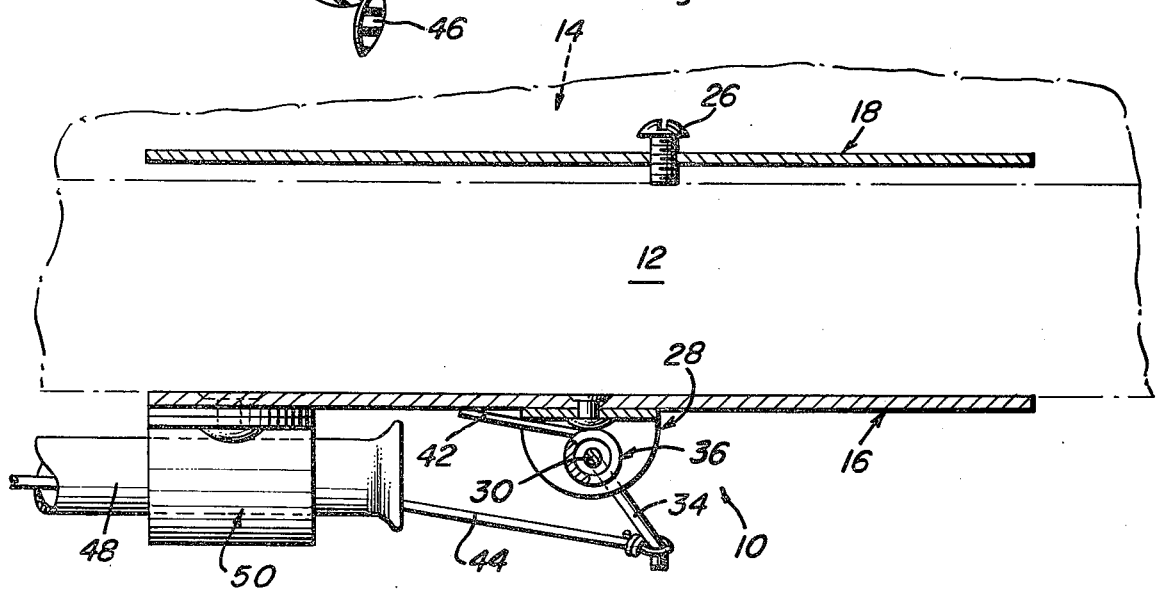
FIG. 3 is a fragmentary, sectional view taken generally along the line 3—3 of FIG. 2.

Referring now more particularly to the three figures of the drawing, a trolling drag meter 10 according to the present invention is shown in FIG. 1 as mounted on a, for example, side wall 12 of a conventional boat 14, and the like. Although the drag meter 10 is shown mounted on a gunwale of a, for example, conventional rowboat, and the like, it is to be understood that the present invention may be arranged on another suitable portion of a boat, such as the transom.

The base for drag meter 10 is a frame which actually mounts the drag meter onto the boat. This frame is advantageously formed by a pair of angle brackets 16 and 18, each bracket of a predetermined length and having the conventional pair of legs. One leg of bracket 16 is provided with a slot extending longitudinally toward the other leg of bracket 16, with the leg provided with slot 20 arranged abutting a leg of bracket 18 in such a manner that the brackets 16 and 18 form a channel. A conventional bolt 22 and associated wing nut 24 cooperate with the slot and an aperture provided in the bracket leg abutting the slotted leg in a conventional manner for adjustably connecting together brackets 16 and 18 to permit the channel formed thereby to be adjusted for side walls, and the like, of varying thicknesses. While bolt 22 preferably is provided with a conventional countersunk head which mates with a flared opening in that portion of the aperture associated with an inner surface of the bracket leg so as to make the bolt head flush with such inner surface, it is to be understood that other suitable arrangements may be employed, such as a stud extending from the outer surface of the bracket leg in a manner not illustrated.

A bell-crank pivot pointer is mounted on the frame for pivotal movement with respect thereto as by a pivot bracket 28 of a substantially U-shaped configuration in that it is provided with a substantially planar web or back portion having parallel legs extending from same.

These legs have openings through which a shaft 30 is pivotally journaled in a manner well known. Shaft 30 is provided with a pair of substantially parallel arms 32 and 34 extending in opposite directions from spaced ends of shaft 30. Arm 32 is arranged connected to a drag line arrangement, to be described below, and forms a crank, while arm 34 forms a pointer, the purpose of which will also be described below. Shaft 30, crank 32, and pointer 34 cooperate to form the aforementioned bell-crank pivot pointer.

A spring 36 is associated with the pointer arrangement for normally biasing pointer 34 toward a one direction of pivotal movement. This direction is counterclockwise in the drawing. Spring 36 is preferably a coiled torsion spring having a pair of ends, and with the coils thereof arranged around shaft 30 as shown. A one end 38 of spring 36 is anchored in a hole 40 provided in shaft 30, while the other end 42 abuts pivot bracket 28.

A drag line arrangement according to the present invention advantageously includes a line 44 connected at a one end thereof to the arm 32 adjacent the outer end thereof. In this manner, arm 32 forms the aforementioned crank. A lure 46 is connected to the other end of line 44, that is the end spaced from the end connected to arm 32, so as to be dragged in the associated water, and the like. A tube 48, constructed from a substantially rigid or self-supporting material, is mounted on the frame as by a conventional clamp 50 attached to a leg of bracket 16, specifically the leg not provided with a slot and on which the pivot bracket 28 is mounted. Tube 48 is arranged extending toward the associated water, and line 44 is arranged passing through tube 48 for being guided thereby toward the water. Thus, in a simple manner, line 44 and its associated lure 46 are arranged in water on which the boat is riding by properly configuring self-supporting tube 48.

Suitable markings 52 are provided on the leg of bracket 16 provided with slot 20, and are arranged forming a scale which cooperates with the arm 34 forming a pointer to indicate the relative drag on lure 46. It is to be understood that markings 52 will be calibrated in a known manner as a function of spring 36 and the size of lure 46. In this manner, therefore, once calibrated, a drag meter 10 may be used to indicate the, for example, best trolling action of a fishing lure.

Although any suitable, known materials may be used to construct a drag meter according to the present invention, a suitable metal such as steel is generally preferred for most elements. Further, the placement of a pair of stop rests 54 and 56 on the slot 20 provided in leg of bracket 16 is desirable for limiting the pivotal movement of arm 34.

The purpose of a trolling drag meter according to the present invention is to indicate the drag of the lure 46 through the water as a function of the one, or normally biased, direction of pivotal movement. Tube 48 bent into a substantially S or Z configuration will cause lure 46 to remain submerged below the surface of the water even in rough water. When the user starts to catch fish, he notes the indication on the scale and holds the same drag or action, on the fishing drag lure as a function of the scale indication. This may be accomplished by holding the pointer on the same, for example, number of the scale and playing out the same length of fishing line. In this manner, greater catches can be obtained.

Because the construction of a trolling drag meter according to the present invention will keep the drag lure beneath the surface of the water even in rough water, the fishermen will be able to catch more fish in rough water, and the drag line will not be appreciably affected by wind, waves, and the like. Further, a trolling drag meter according to the present invention is compact and can be arranged so as not to be damaged by accidental bumping of the boat against rocks, rocky shores, and the like.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A trolling drag meter, comprising, in combination:
   a. frame means for mounting on a boat;
   b. pointer means mounted on the frame means for pivotal movement with respect to the frame means;
   c. means for biasing the pointer means toward a one direction of pivotal movement; and
   d. drag means connected to the pointer means for arrangement in water on which a boat associated with the frame means is riding for indicating the drag means through the water as a function of the pivotal movement of the pointer means in the direction opposite to the one direction of pivotal movement, the frame means including a pair of angle brackets, each of the brackets having a pair of legs, and one leg of a one of the brackets being provided with a slot extending longitudinally toward the other leg of the bracket, the leg provided with the slot being arranged abutting a leg of the other bracket, fastener means associated with the slot for adjustably connecting together the angle brackets in an arrangement forming a channel, and, means for removably locking the channel on a boat wall, the frame means being provided with means cooperating with the pointer for indicating the drag on a lure.

2. A structure as defined in claim 1, wherein the pointer means includes a pivot bracket mounted on the channel, a shaft pivotally mounted on the pivot bracket, the shaft being provided with substantially parallel arms extending in opposite directions from spaced ends of the shaft, one of the arms connected to the means for arrangement and forming a crank, and the other of the arms forming a pointer, the shaft, crank, and pointer forming a bell-crank pivot pointer.

3. A structure as defined in claim 2, wherein the means for biasing the pointer means includes a coiled torsion spring having a pair of ends and with the coils thereof arranged around the shaft, one of the ends of the spring anchored in a hole provided in the shaft and the other of the ends abutting the pivot bracket.

4. A structure as defined in claim 2, wherein the drag means includes a line connected at a one end thereof to the crank, a lure connected to the other end of the line, and a tube mounted on the frame means and arranged extending toward the associated water, the line arranged passing through the tube for being guided toward the water.

5. A trolling drag meter, comprising, in combination:

a. frame means for mounting on a boat;
b. pointer means mounted on the frame means for pivotal movement with respect to the frame means;
c. means for biasing the pointer means toward a one direction of pivotal movement; and
d. drag means connected to the pointer means for arrangement in water on which a boat associated with the frame means is riding for indicating the drag of the drag means through the water as a function of the pivotal movement of the pointer means in the direction opposite to the one direction of pivotal movement, the frame means including a pair of angle brackets, each of the brackets having a pair of legs, and one leg of a one of the brackets being provided with a slot extending longitudinally toward the other leg of the bracket, the leg provided with the slot being arranged abutting a leg of the other bracket, fastener means associated with the slot for adjustably connecting together the angle brackets in an arrangement forming a channel, and means for removably locking the channel on a boat wall, the pointer means including a pivot bracket mounted on the channel, a shaft pivotally mounted on the pivot bracket, the shaft being provided with substantially parallel arms extending in opposite directions from spaced ends of the shaft, one of the arms connected to the means for arrangement and forming a crank, and the other of the arms forming a pointer, the shaft, crank, and pointer forming a bell-crank pivot pointer, the means for biasing the pointer means including a coiled torsion spring having a pair of ends and with the coils thereof arranged around the shaft, one of the ends of the spring anchored in a hole provided in the shaft and the other of the ends abutting the pivot bracket, the drag means including a line connected at a one end thereof to the crank, a lure connected to the other end of the line, and a tube mounted on the frame means and arranged extending toward the associated water, the line arranged passing through the tube for being guided toward the water, the frame means being provided with markings formed a scale arranged for cooperating with the pointer to indicate the drag on the lure.

6. A trolling drag meter, comprising, in combination:
a. frame means for mounting on a boat;
b. pointer means mounted on the frame means for pivotal movement with respect to the frame means;
c. means for biasing the pointer means toward a one direction of pivotal movement; and
d. drag means connected to the pointer means for arrangement in water on which a boat associated with the frame means is riding for indicating the drag of the drag means through the water as a function of the pivotal movement of the pointer means in the direction opposite to the one direction of pivotal movement, the pointer means including a pivot bracket mounted on the frame means, a shaft pivotally mounted on the pivot bracket, the shaft being provided with substantially parallel arms extending in opposite directions from spaced ends of the shaft, one of the arms connected to the means for arrangement and forming a crank, and the other of the arms forming a pointer, the shaft, crank, and pointer forming a bell-crank pivot pointer, the frame means being provided with markings forming a scale arranged for cooperating with the pointer means to indicate the drag on the drag means.

7. A structure as defined in claim 6, wherein the means for biasing the pointer means includes a coiled torsion spring having a pair of ends and with the coils thereof arranged around the pointer means, one of the ends of the spring anchored in a hole provided in the pointer means and the other of the ends abutting the pivot bracket.

8. A structure as defined in claim 6, wherein the drag means includes a line connected at a one end thereof to the pointer means, a lure connected to the other end of the line, and a tube mounted on the frame means and arranged extending toward the associated water, the line arranged passing through the tube for being guided toward the water.

* * * * *